United States Patent
Tsujita

[19]

[11] Patent Number: 6,138,035
[45] Date of Patent: Oct. 24, 2000

[54] MOBILE COMMUNICATION SYSTEM HAVING CORDLESS HANDY PHONE UNIT AS MOBILE STATION

[76] Inventor: Shigeru Tsujita, c/o NEC IC Microcomputer Systems, Ltd., 403-53, Kosugimachi 1-chome, Nakahara-ku, Kawasaki-shi, Kanagawa, Japan

[21] Appl. No.: 09/016,458

[22] Filed: Jan. 30, 1998

[30] Foreign Application Priority Data

Jan. 30, 1997 [JP] Japan ..................................... 9-016887

[51] Int. Cl.$^7$ ..................................................... H04B 1/38
[52] U.S. Cl. ........................ 455/552; 455/455; 455/453; 455/426; 455/515; 455/462; 455/465
[58] Field of Search ..................................... 455/426, 552, 455/443, 444, 434, 515, 462, 465, 553

[56] References Cited

U.S. PATENT DOCUMENTS

| | | | |
|---|---|---|---|
| 4,268,722 | 5/1981 | Little et al. ................................... | 179/2 |
| 4,485,486 | 11/1984 | Webb et al. ................................ | 455/33 |
| 5,127,042 | 6/1992 | Gillig et al. ................................ | 379/59 |
| 5,442,680 | 8/1995 | Schellinger et al. ....................... | 379/58 |
| 5,450,474 | 9/1995 | Hoflinger .................................... | 379/61 |
| 5,703,934 | 12/1997 | Zicker et al. .............................. | 379/61 |
| 5,724,647 | 3/1998 | Sato ...................................... | 455/54.1 |
| 5,898,929 | 4/1999 | Haartsen ................................... | 455/462 |
| 5,920,818 | 7/1999 | Frodigh et al. .......................... | 455/443 |
| 5,930,726 | 7/1999 | Fujita ....................................... | 455/555 |

FOREIGN PATENT DOCUMENTS

| | | |
|---|---|---|
| WO 93/16549 | 8/1993 | European Pat. Off. . |
| WO 94/23527 | 10/1994 | European Pat. Off. . |
| 4-287436 | 10/1992 | Japan . |
| 5-160785 | 6/1993 | Japan . |
| 5-183496 | 7/1993 | Japan . |
| 7-143557 | 6/1995 | Japan . |
| 7-147695 | 6/1995 | Japan . |
| 10-94052 | 4/1998 | Japan . |

*Primary Examiner*—Fan Tsang
*Assistant Examiner*—Marceau Milord
*Attorney, Agent, or Firm*—Scully, Scott, Murphy & Presser

[57] ABSTRACT

In a mobile communication system including an outdoor public base station, an indoor private host phone unit, and a mobile station formed by a cordless handy phone unit, when the mobile station is located within an area where a service area of the outdoor public base station overlaps a service area of the indoor private host phone unit, the mobile station waits for connection with the outdoor public base station by way of the host phone unit. Thus, the mobile station always waits for connection only with the indoor private host phone unit.

2 Claims, 20 Drawing Sheets

SIMULTANEOUS INCOMING CALL RECEIVING OPERATION FROM BS & HP

CCH-B ····· CONTOROL CHANNEL OF BS
CCH-H ····· CONTOROL CHANNEL OF HP
B ····· BROADCASTING CHANNEL
P1, P2 ·····PAGING CALLING CHANNEL
S ····· SELECTIVE CELL CHANNEL

CALL CONNECTION REQUESTING OPERATION FOR BS

CCH-B ····· CONTOROL CHANNEL OF BS
CCH-M ····· CONTOROL CHANNEL OF MS
B ····· BROADCASTING CHANNEL
P1, P2 ·····PAGING CALLING CHANNEL
S ····· SELECTIVE CELL CHANNEL

CALL CONNECTION & SPEECH OPERATION FOR BS

TCH ····· BIDIRECTIONAL TRAFFIC CHANNEL

INCOMING CALL RECEIVING OPERATION ONLY FROM BS

CCH-B ···· CONTOROL CHANNEL OF BS
B ···· BROADCASTING CHANNEL
P1, P2 ····PAGING CALLING CHANNEL
S ···· SELECTIVE CELL CHANNEL

INCOMING CALL RECEIVING OPERATION ONLY FROM HP

CCH-H ····· CONTOROL CHANNEL OF HP
B ····· BROADCASTING CHANNEL
P1, P2 ·····PAGING CALLING CHANNEL
S ····· SELECTIVE CELL CHANNEL

SIMULTANEOUS INCOMING CALL RECEIVING OPERATION FOR BS & HP

CCH-B ····· CONTOROL CHANNEL OF BS
CCH-H ····· CONTOROL CHANNEL OF HP
B ····· BROADCASTING CHANNEL
P1, P2 ·····PAGING CALLING CHANNEL
S ····· SELECTIVE CELL CHANNEL

CALL CONNECTION REQUESTING OPERATION FOR BS

CCH-B ····· CONTOROL CHANNEL OF BS
CCH-M ····· CONTOROL CHANNEL OF MS
B ····· BROADCASTING CHANNEL
P1, P2 ·····PAGING CALLING CHANNEL

CALL CONNECTION & SPEECH OPERATION FOR BS

TCH ···· BIDIRECTIONAL TRAFFIC CHANNEL

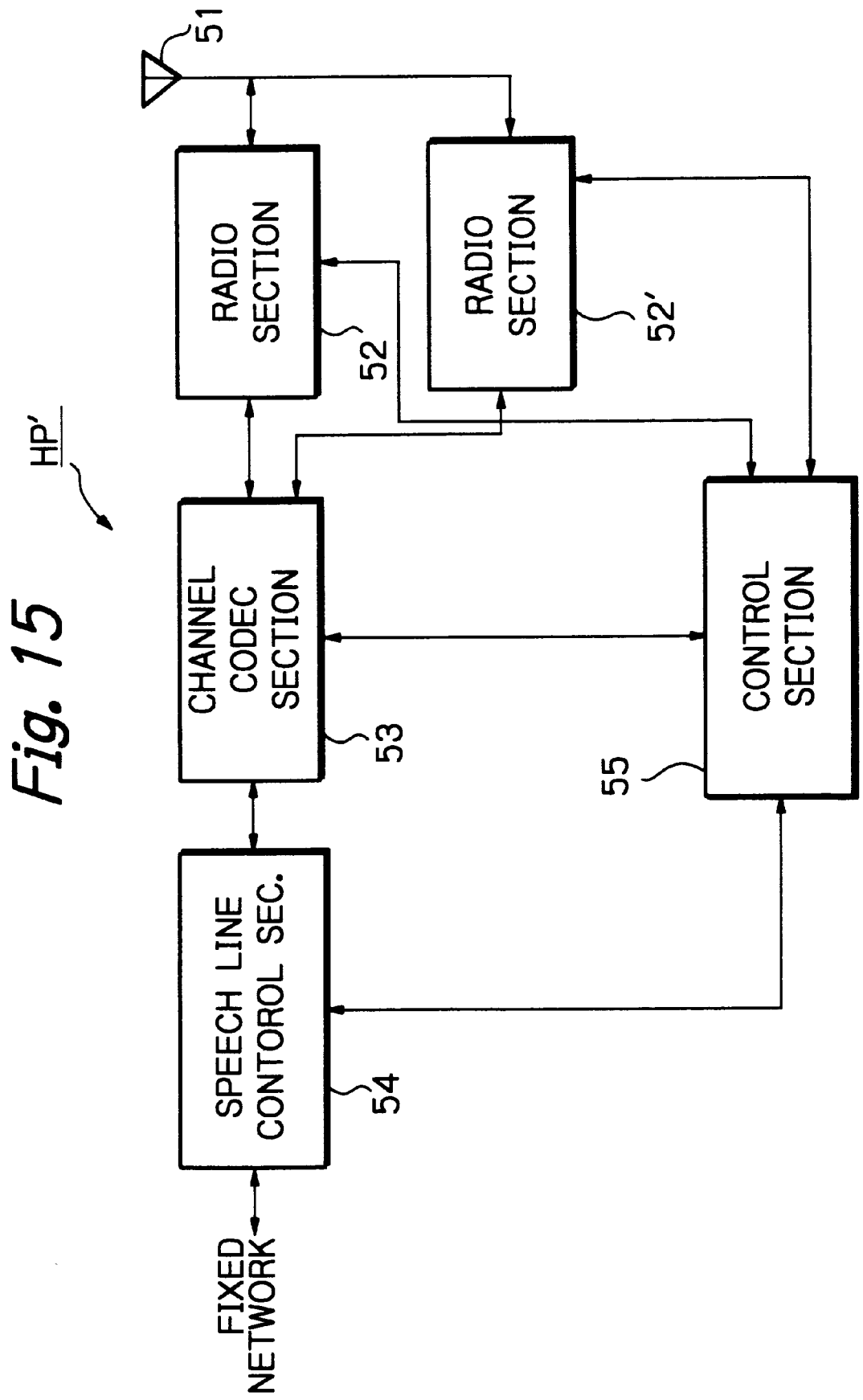

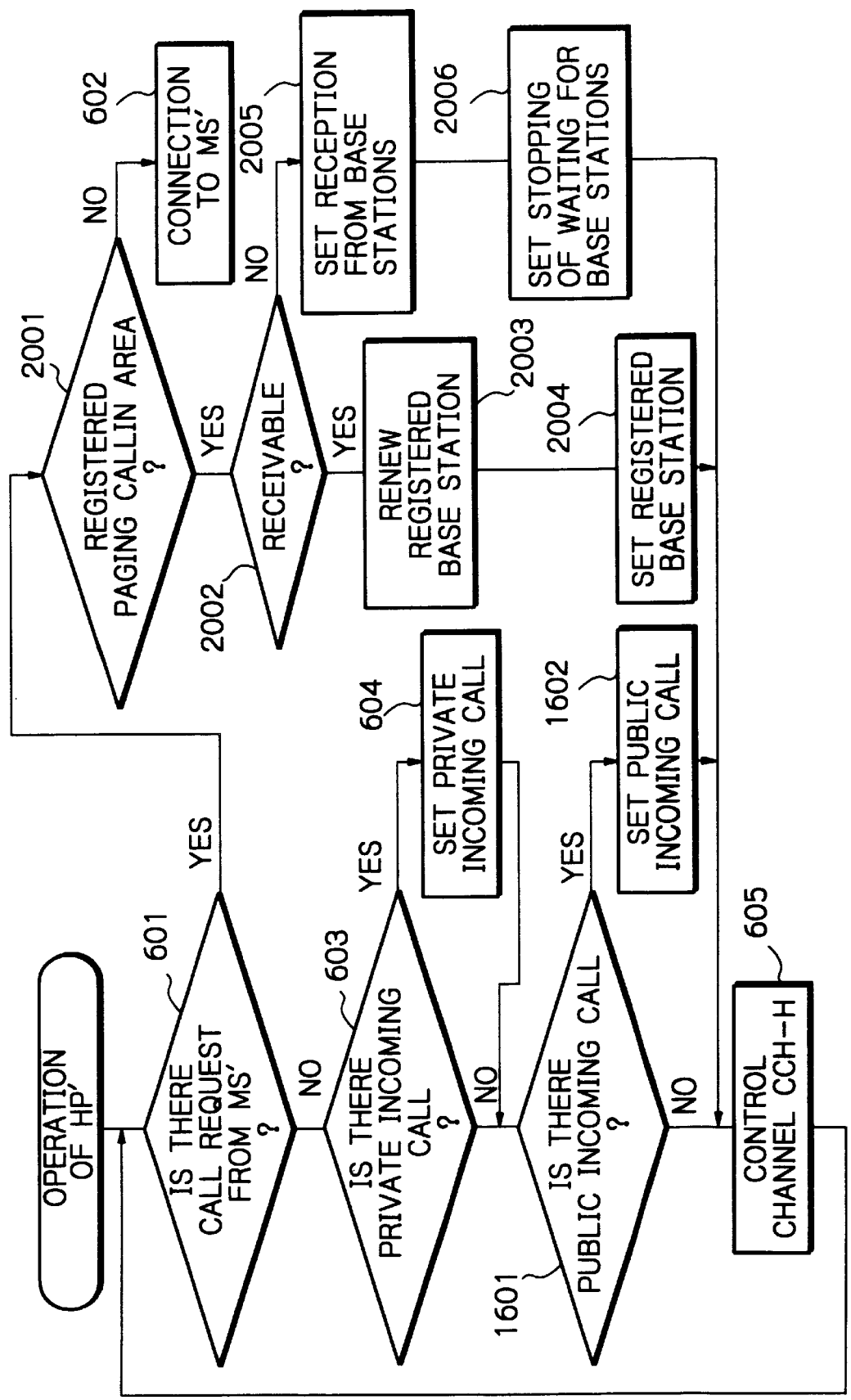

MOBILE COMMUNICATION SYSTEM HAVING CORDLESS HANDY PHONE UNIT AS MOBILE STATION

BACKGROUND OF THE INVENTION

1. Field of the Invention

The present invention relates to a mobile communication system including an outdoor public base station, an indoor private host phone unit, and a mobile station formed by a cordless handy phone unit, and more particularly, to an improvement of a simultaneous incoming call receiving operation when the mobile station is located within an area where a service area of the base station overlaps a service area of the host phone unit.

2. Description of the Related Art

With a so-called second generation cordless telephone system including an outdoor public base station connected to a fixed network, an indoor private host phone unit (base station) and mobile stations, there are calls made basically outdoors by way of the base station (hereinafter referred to as outdoor public calls), those made basically indoors by way of the host phone unit (hereinafter referred to as indoor private calls) and those made from mobile stations to others by directly transmitting and receiving radio waves without using the base station and the host phone unit (hereinafter referred to as inter-mobile station direct calls).

When one of the mobile stations is waiting for an incoming call, it acquires the broadcasting information including channel structure information being transmitted from the base station or the host phone unit and operates intermittently for reception (hereinafter referred to as intermittent receiving operation) in accordance with the transmission timing of the paging calling channel it obtained by using the broadcasting information.

In a synchronous incoming call waiting (receiving) mode for the base station and the host phone unit, however, since the reception timing of the mobile station is formed by combining intermittent reception timings of the base station and the host phone unit, the number of receptions and the number of times of switching reception frequencies will becomes enormous which will increase the power dissipation of the mobile station. As a result, the operation hours of the mobile station that is generally powered by batteries is inevitably made very short. This will be explained later in detail.

If it is able to wait for a plurality of calls including outdoor public calls, indoor private calls or inter-mobile station calls, the mobile station waits for incoming calls sequentially on a time-sharing basis if necessary. For example, JP-A-7-143557 discloses a cordless telephone system adapted for waiting for incoming calls sequentially on a time-sharing basis particularly for outdoor public calls and inter-mobile station direct calls, and JP-A-7-147695 discloses a cordless telephone system adapted for waiting for incoming calls sequentially on a time-sharing basis particularly for indoor private calls and inter-mobile station direct calls.

SUMMARY OF THE INVENTION

It is an object of the present invention to provide a mobile communication system including a cordless handy phone unit as a mobile station capable of reducing the power dissipation of the mobile station.

According to the present invention, in a mobile communication system including an outdoor public base station, an indoor private host phone unit, and a mobile station formed by a cordless handy phone unit, wherein, when the mobile station is located within an area where a service area of the base station overlaps a service area of the host phone unit, the mobile station waits for connection with the outdoor base station by way of the host phone unit.

Thus, the mobile station always waits for connection only with the host phone unit. This is helpful for reducing the power dissipation of the mobile station.

BRIEF DESCRIPTION OF THE DRAWINGS

The present invention will be more clearly understood from the description as set forth below, in comparison with the prior art, with reference to the accompanying drawings, wherein:

FIG. 15 is a detailed block diagram of the base station of FIG. 9;

FIG. 20 is diagram showing the operation of the system of FIG. 19.

DESCRIPTION OF THE PREFERRED EMBODIMENTS

Before the description of the preferred embodiments, a prior art mobile communication system using a personal hand phone unit will be explained with reference to FIGS. 1, 2A, 2B, 3A, 3B, 4A, 4B, 5, 6, 7, 8A and 8B.

Figure 1:
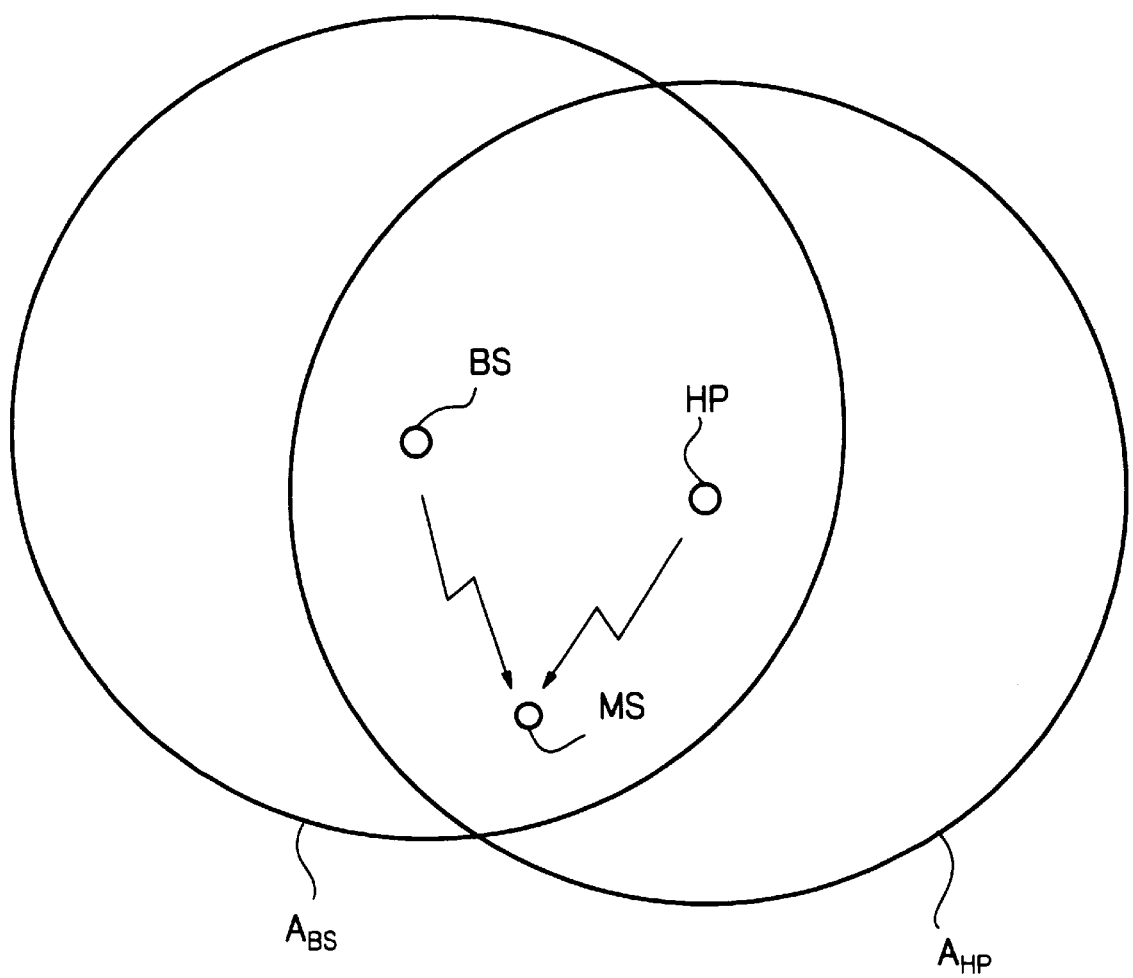
FIG. 1 is a diagram illustrating a prior art mobile communication system.

In FIG. 1, which illustrates a prior art mobile communication system, a base station BS is connected to a control station (not shown) including a switching network and has a service area $A_{BS}$ within which its radio wave can be received. Also, a host phone unit HP has a service area $A_{HP}$ within which its radio wave can be received. Further, a mobile station MS formed by a cordless handy phone unit is located within an area where the service areas $A_{BS}$ and $A_{HP}$ overlap each other, and hence, the mobile station MS can receive radio waves from the base station BS and the host phone unit HP.

The mobile communication system of FIG. 1 will be explained next with reference to FIGS. 2A, 2B, 3A, 3B, 4A and 4B. Here, the operation is based upon Personal Handy Phone System ARIB Standard RCR STD-28 established by the Association of Radio Industries and Business.

Figure 2A:
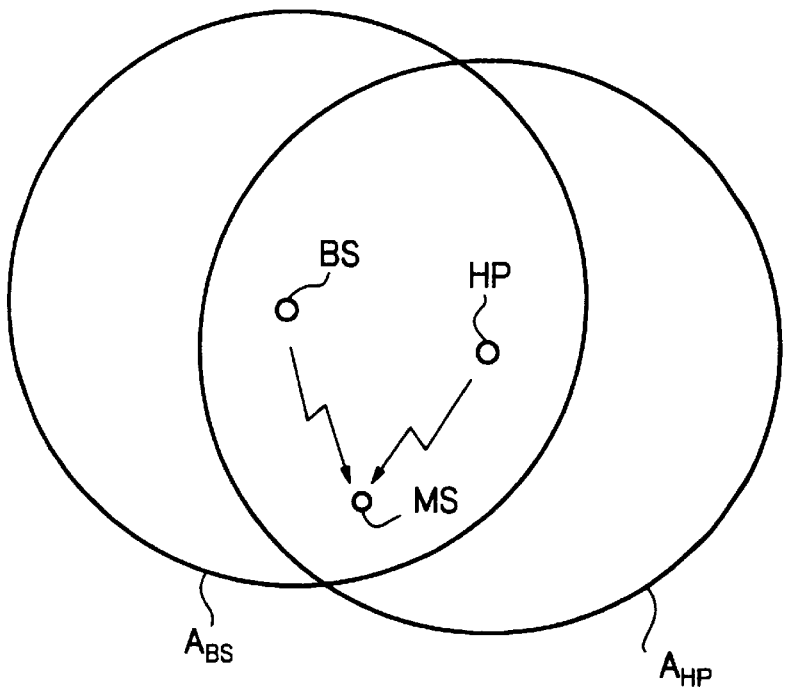
FIGS. 2A, 3A and 4A are diagrams showing the operation of the system of FIG. 1.
Figure 2B:
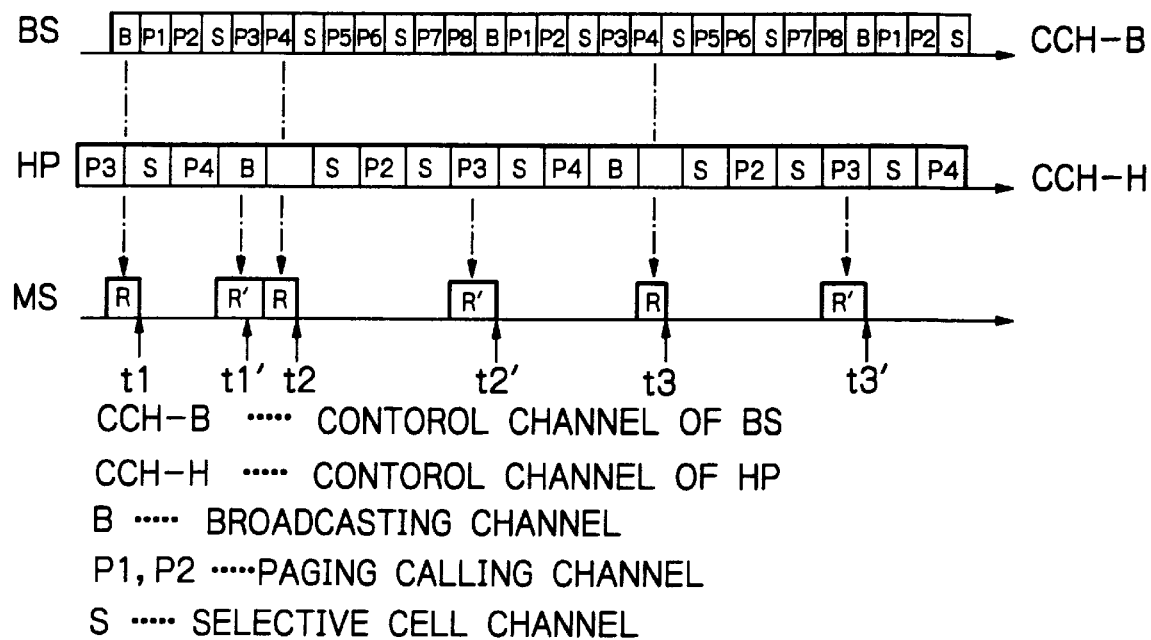
FIGS. 2B, 3B and 4B are timing diagrams for explaining the operations as illustrated in FIGS. 2A, 3A and 4A, respectively.

A simultaneous incoming call receiving operation from the base station BS and the host phone unit HP is shown in FIGS. 2A and 2B. That is, the base station BS generates a control channel CCH-B as shown in FIG. 2A which has time division multiplex access (TDMA) time slots formed by a broadcasting channel B, paging calling channels P1, P2, . . ., and a selective cell channel S, as shown in FIG. 2B. In this case, the broadcasting channel B has structure information (order and intervals) of the control channel CCH-B and is transmitted to all mobile stations including the mobile station MS. Each of the paging calling channels P1, P2, . . . is used for informing call incoming to a specified group of mobile stations. The selective cell channel S is used for transmitting and receiving information regarding call requests.

If the host phone unit HP receives a private call incoming, the host phone unit HP generates a control channel CCH-H as shown in FIGS. 2A and 2B similar to the control channel CCH-B.

Note that a control channel from the mobile station MS to the base station BS is constructed by selective cell channels.

As shown in FIG. 2B, at time t1, when the mobile station MS receives a broadcasting channel B of the control channel CCH-B from the base station BS, the mobile station MS identifies a group to which it belongs according to the received broadcasting channel B. As a result, the mobile station MS waits for an incoming call addressed to it by receiving paging calling channels such as P4 for the group. Therefore, at times t2, t3, . . . , the mobile station MS receives special paging calling channels such as P4 of the control channel CCH-B intermittently, to complete an incoming call receiving operation for the base station BS.

Simultaneously, as shown in FIG. 2B, at time t1', when the mobile station MS receives a broadcasting channel B of the control channel CCH-H from the host phone unit HP, the mobile station MS identifies a group to which it belongs according to the received broadcasting channel B. As a result, the mobile station MS waits for an incoming call addressed to it by receiving paging calling channels such as P3 for the group. Therefore, at times t2', t3', . . . , the mobile station MS receives special paging calling channels such as P3 of the control channel CCH-H intermittently, to complete an incoming call receiving operation for the host phone unit HP.

Thus, the mobile station MS can wait for an incoming call from both of the base station BS and the host phone unit HP, simultaneously.

Figure 3A:
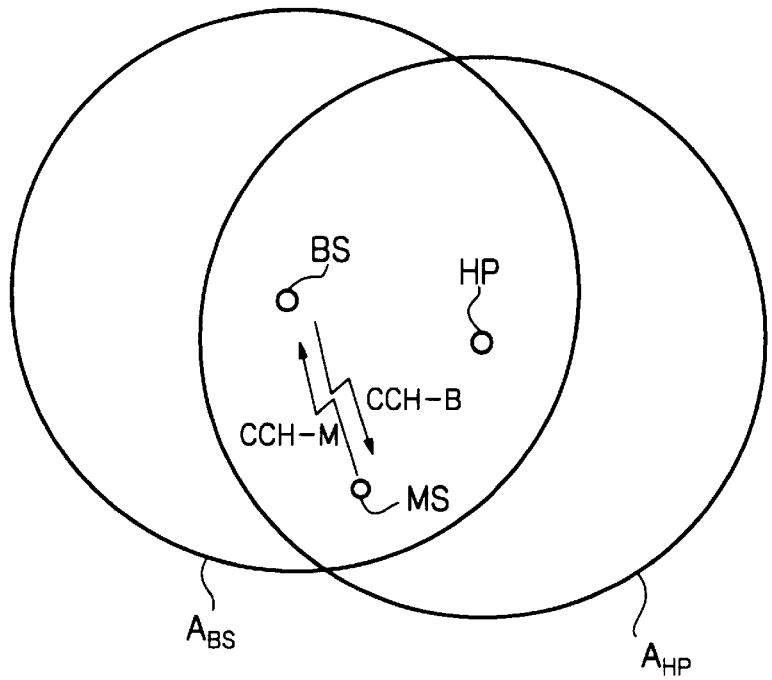
Figure 3B:
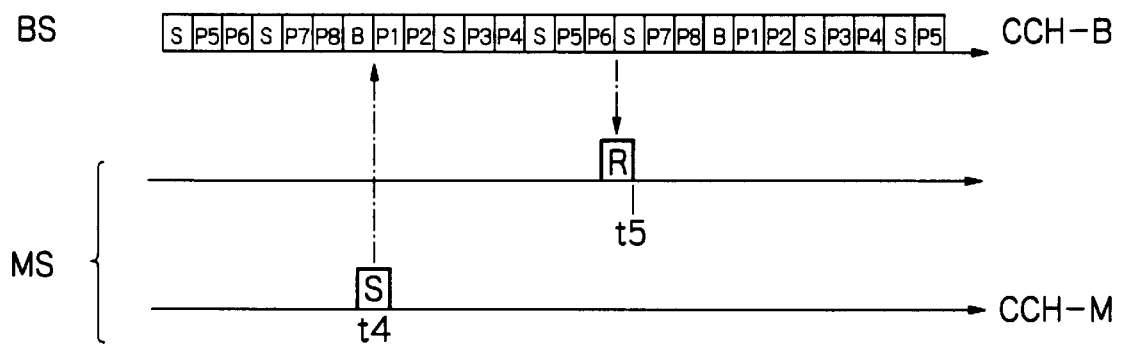

Next, if reception of an incoming call from the mobile station MS is completed, a call connection requesting operation for the base station BS is carried out as shown in FIGS. 3A and 3B. That is, at time t4, the mobile station MS transmits a control channel CCH-M formed by a selective cell channel S to the base station BS, to request a call connection. Then, at time t5, the base station BS allocates a traffic channel to the mobile station MS by using the selective cell channel S of the control channel CCH-B. As a result, the transmitting/receiving frequencies are switched to a frequency of a bidirectional traffic channel TCH.

Figure 4A:
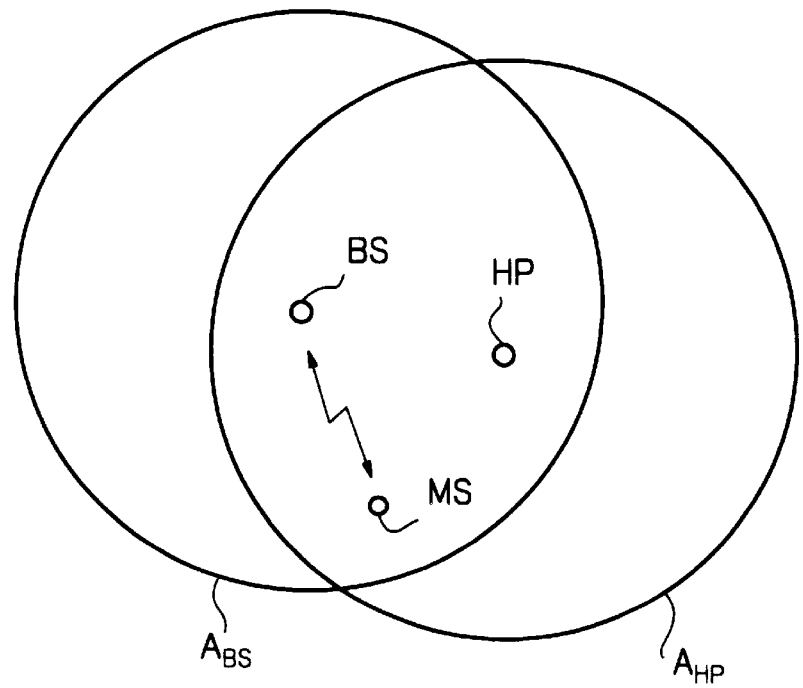
Figure 4B:
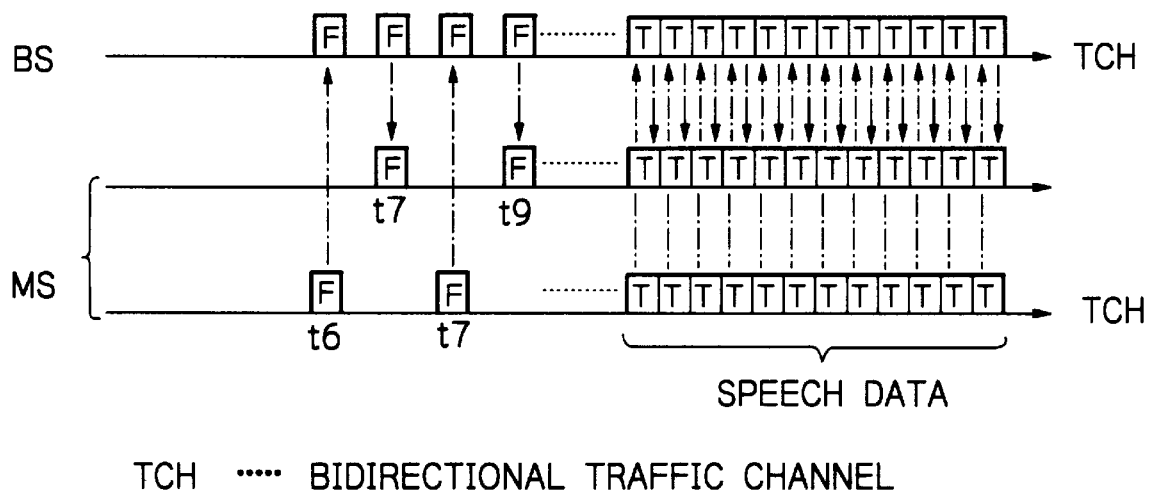

Finally, a call connection and speech operation for the base station BS is carried out as shown in FIGS. 4A and 4B. That is, at times t6, t7, t8 and t9, the mobile station MS transmits a call connection message to the base station BS and receives a call connection message from the base station BS, to complete a call connection on the bidirectional traffic channel TCH. Thereafter, speech is realized by transmitting and receiving speech data continuously between the mobile station MS and a calling party from the base station BS.

Note that, if reception of a private incoming call from the host phone unit HP is completed, a connection requesting operation for the host phone unit HP, a call connection operation and a speech operation for the host phone unit HP described above are carried out.

Figure 5:
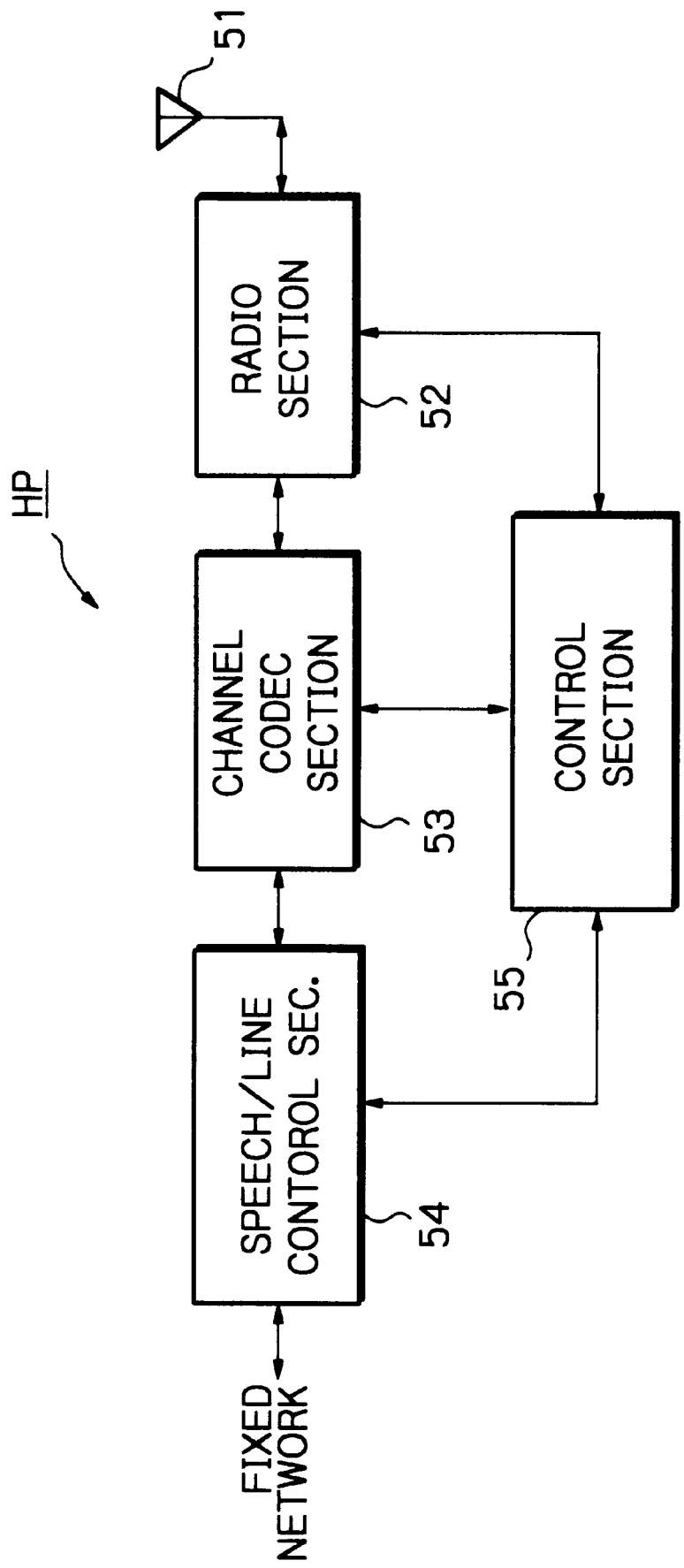
FIG. 5 is a detailed block diagram of the base station of FIG. 1.

In FIG. 5, which is a detailed block diagram of the host phone unit HP of FIG. 1 for realizing the operation as shown in FIGS. 2A, 2B, 3A, 3B, 4A and 4B, the host phone unit HP is formed by an antenna 51 for transmitting and receiving radio waves, a radio section 52 for modulating/demodulating data and transmitting signals to and receiving signals from the antenna 51, a channel codec section 53 for coding/decoding speech/control data, and a speech/line control section 54 for monitoring the operation of the channel codec section 53 and incoming signals from a fixed network. Also, a control section 55 constructed by a microcomputer controls the radio section 52, the channel codec section 53 and the speech/line control section 54, and transmits and receives control messages in traffic channels.

Figure 6:
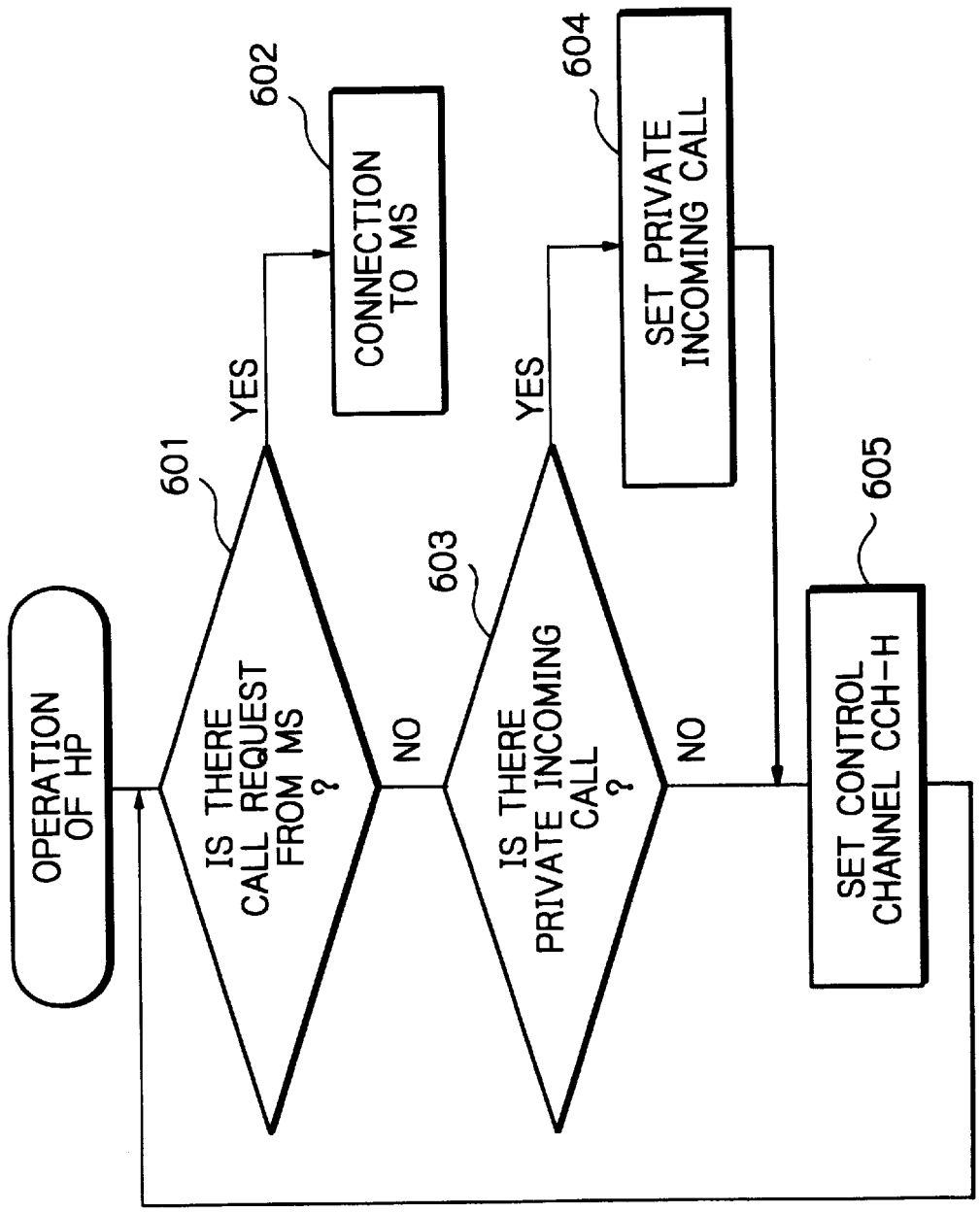
FIG. 6 is a flowchart showing the operation of the base station of FIG. 5.

An incoming call receiving operation of the host phone unit HP of FIG. 1 is carried out by the control section 55 using a flowchart of FIG. 6.

Firstly, at step 601, it is determined whether or not there is a reception of a call request in a private control channel from the mobile station MS by means of the channel codec section 53. If there is such a reception, the control proceeds to step 602 which connects a call to the mobile station MS. Otherwise, the control proceeds to step 603.

At step 603, it is determined whether or not there is a private incoming call from the fixed network by means of the speech/line control section 54. If there is such a private incoming call, the control proceeds to step 604 which sets a private incoming call information in a control channel. Then, the control proceeds to step 605. If it is determined at step 603 that there is not a private incoming call, the control proceeds directly to step 605.

At step 605, the control selects a control channel transmission mode and transmits it to the channel/codec section 52, thus generating a control channel CCH-H as shown in FIG. 2A.

Figure 7:
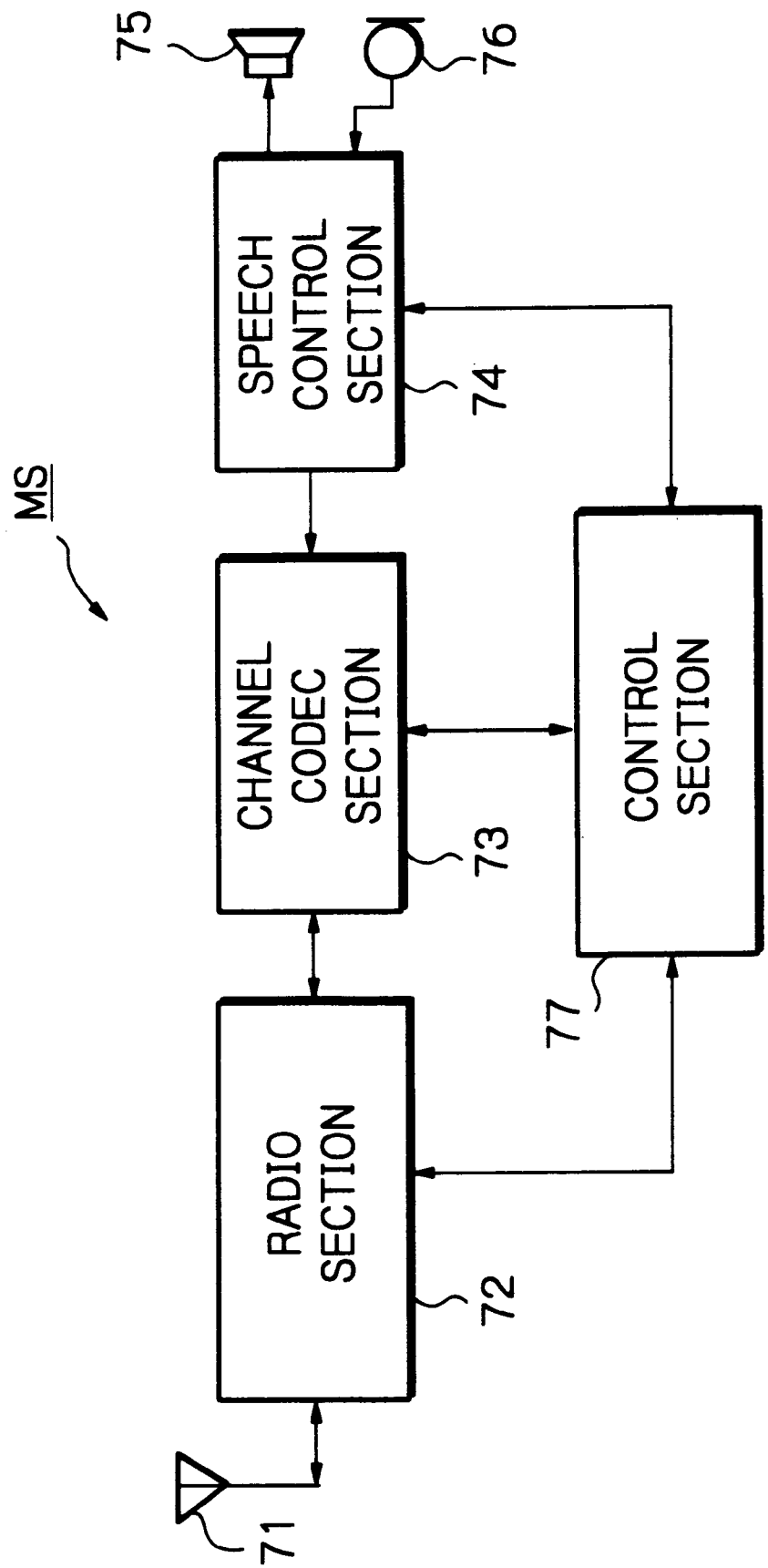
FIG. 7 is a detailed block diagram of the host phone unit of FIG. 1.

In FIG. 7, which is a detailed block diagram of the mobile station MS of FIG. 1 for realizing the operation as shown in FIGS. 2A, 2B, 3A, 3B, 4A and 4B the mobile station MS is formed by an antenna 71 for transmitting and receiving radio waves, a radio section 72 for modulating/demodulating data and transmitting signals to and receiving signals from the antenna 71, a channel codec section 73 for coding/decoding speech/control data, a speech control section 74 for coding speech decoding speech data, a loudspeaker 75 for generating speech, and a microphone 76 for receiving speech. Also, a control circuit 77 constructed by a microcomputer controls the radio section 72, the channel codec section 73 and the speech control section 74, and transmits and receives control messages in traffic channels.

Figure 8A:
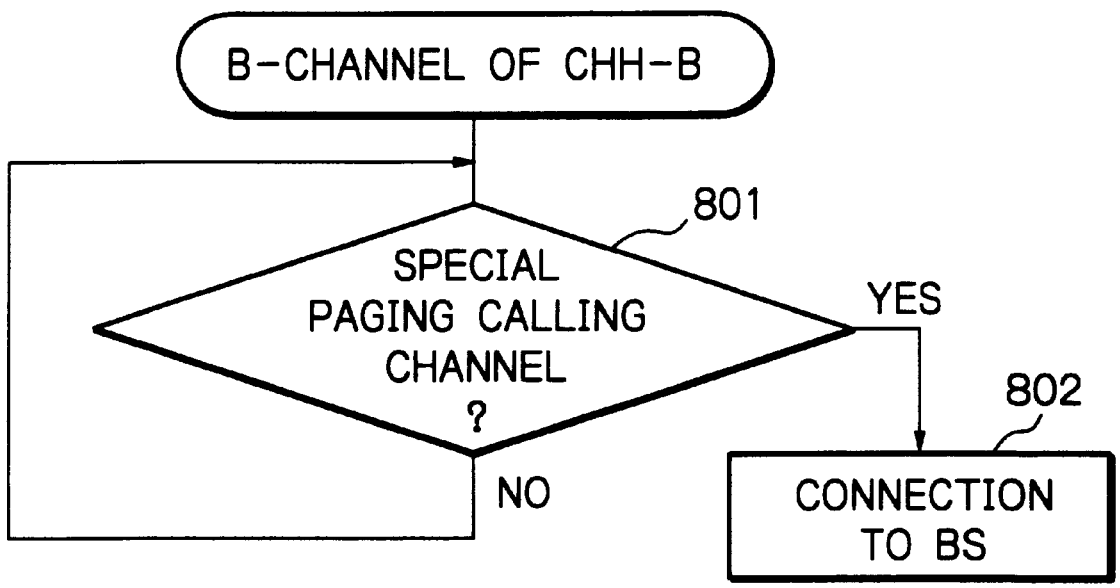
FIGS. 8A and 8B are flowcharts showing the operation of the host phone unit of FIG. 7.
Figure 8B:
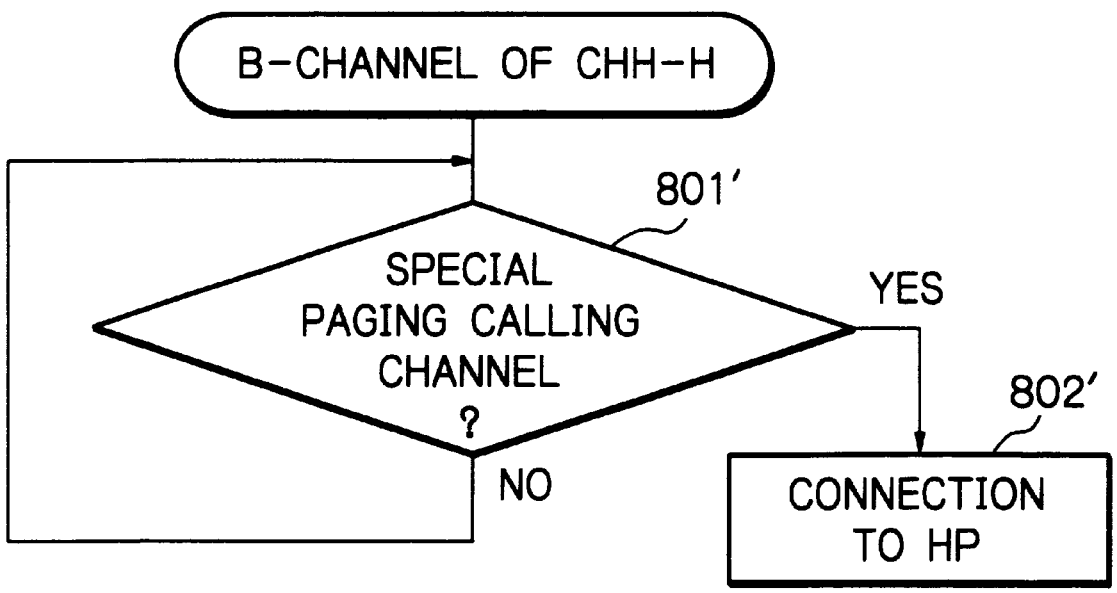

An incoming call receiving operation of the mobile station MS is carried out by the control section 77 according to flowcharts of FIGS. 8A and 8B.

The operation of the flowchart of FIG. 8A is started by receiving a broadcasting channel B of the control channel CCH-B from the base station BS (see time t1 of FIG. 2B).

At step 801, it is determined whether or not a timing for a special paging calling channel such as P4 is realized. Only when such a timing is realized (see times t2, t3, . . . of FIG. 2B), does the control proceed to step 802 which receives a special paging calling channel P4. That is, special paging calling channels are intermittently received. After reception of an incoming call from the mobile station BS is completed, a call connection requesting operation and a call connection are carried out.

The flowchart of FIG. 8B is started by receiving a broadcasting channel B of the control channel CCH-H from the host phone unit HP (see time t1' of FIG. 2B).

At step 801', it is determined whether or not a timing for a special paging calling channel such as P3 is realized. Only when such a timing is realized (see times t2', t3', . . . of FIG. 2B), does the control proceed to step 802' which receives a special paging calling channel P3. That is, special paging calling channels are intermittently received. After reception of an incoming call from the host phone unit HP is completed, a call connection requesting operation and a call connection are carried out.

Note that the reception frequency at the time slots R of FIG. 2B for receiving the control channel CCH-B from the base station BS is generally different from the reception frequency at the time slots R of FIG. 2B for receiving the control channel CCH-H from the host phone unit HP. Therefore, in the mobile station MS, the control section 77 has to switch the reception frequency frequently.

In the mobile communication system as illustrated in FIGS. 1, 2A, 2B, 3A, 3B, 4A, 4B, 5, 6, 7, 8A and 8B, however, in a synchronous incoming call receiving mode, since the reception timing of the mobile station MS is formed by combining intermittent reception timings of a plurality of units such as the base station BS and the host phone unit HP, the number of receptions and the number of times of switching reception frequencies will become enormous which will increase the power dissipation of the mobile station MS. As a result, the operating hours of the mobile station MS that is generally powered by batteries are inevitably made very short.

Figure 9:
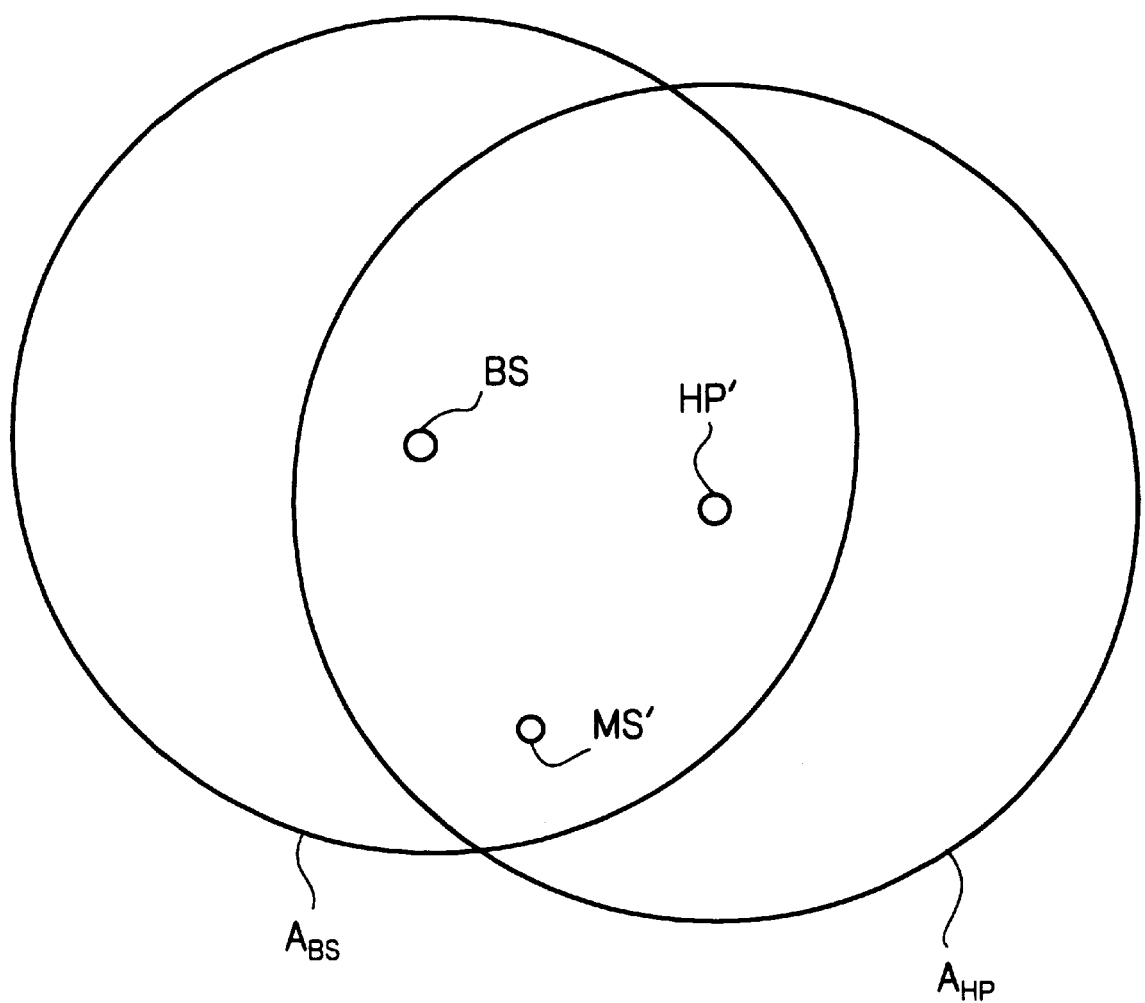
FIG. 9 is a diagram illustrating a first embodiment of the mobile communication system according to the present invention.

In FIG. 9, which illustrates a first embodiment of the mobile communication system according to the present invention, a host phone unit HP' and a mobile station MS' formed by a cordless handy phone unit are provided instead of the host phone unit HP and the mobile station MS, respectively, of FIG. 1. For waiting only for a public incoming call from the base station BS, the mobile station MS' operates to receive a control channel CCH-B from the base station BS. For waiting only for a private incoming call from the host phone unit HP', the mobile station MS' operates to receive a control channel CCH-H from the host phone unit HP'. For simultaneously waiting for a public incoming call from the base station BS and a private incoming call from the host phone unit HP', the mobile station MS' operates to receive a control channel CCH-H from the host phone unit HP', too. This will be explained in detail.

Figure 10A:
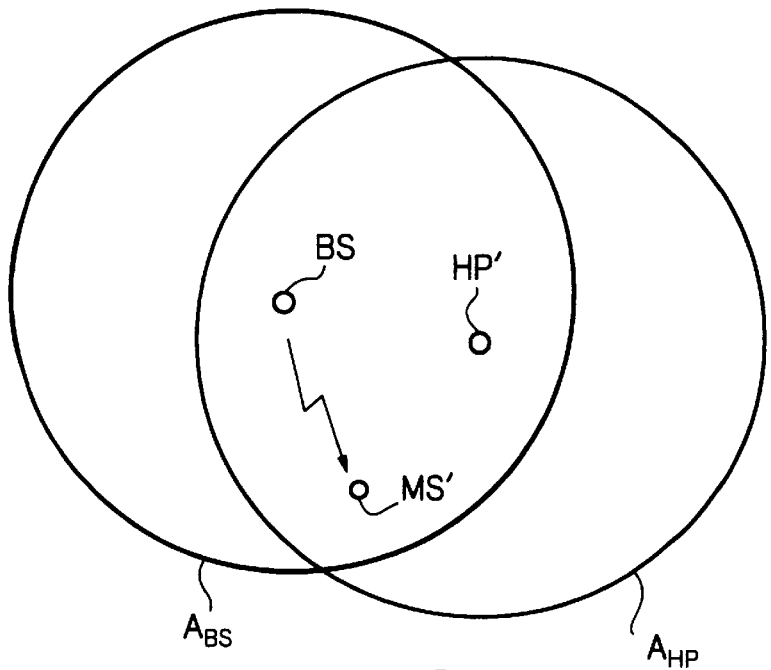
FIGS. 10A, 11A, 12A, 13A and 14A are diagrams showing the operation of the system of FIG. 9.
Figure 10B:
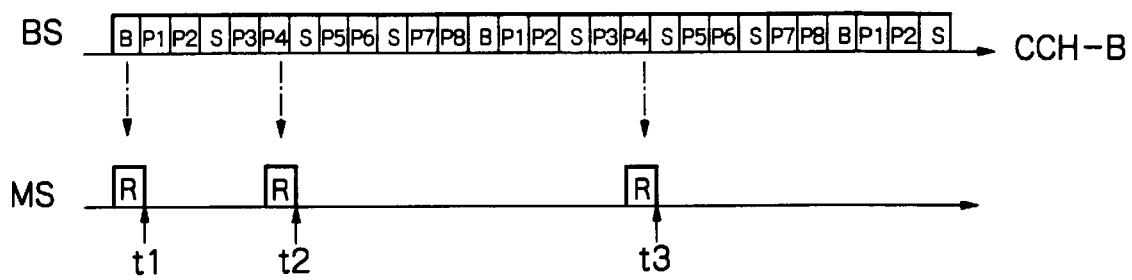
FIGS. 10B, 11B, 12B, 13B and 14B are timing digrams for explaining the operations as illustrated in FIGS. 10A, 11A, 12A, 13A and 14A, respectively.

An incoming call receiving operation from only the base station BS is shown in FIGS. 10A and 10B. In this case, a switch SW1 (see FIG. 17) for a public incoming call receiving mode is turned ON in advance. That is, the base station BS generates a control channel CCH-B as shown in FIG. 10A which has TDMA time slots formed by a broadcasting channel B, paging calling channels P1, P2, . . . and a selective cell channel S, as shown in FIG. 10B.

As shown in FIG. 10B, at time t1, when the mobile station MS' receives a broadcasting channel B of the control channel CCH-B from the base station BS, the mobile station MS' identifies a group to which it belongs according to the received broadcasting channel B. As a result, the mobile station MS' waits for an incoming call addressed to it by receiving paging calling channels such as P4 for the group. Therefore, at times t2, t3, . . . , the mobile station MS' receives special paging calling channels such as P4 of the control channel CCH-B intermittently, to complete an incoming call receiving operation for the base station BS.

Next, if reception of an incoming call from the mobile station MS' is completed, a call connection requesting operation, a call connection operation and a speech operation for the base station BS are carried out in the same way as shown in FIGS. 3A, 3B, 4A and 4B.

Figure 11A:
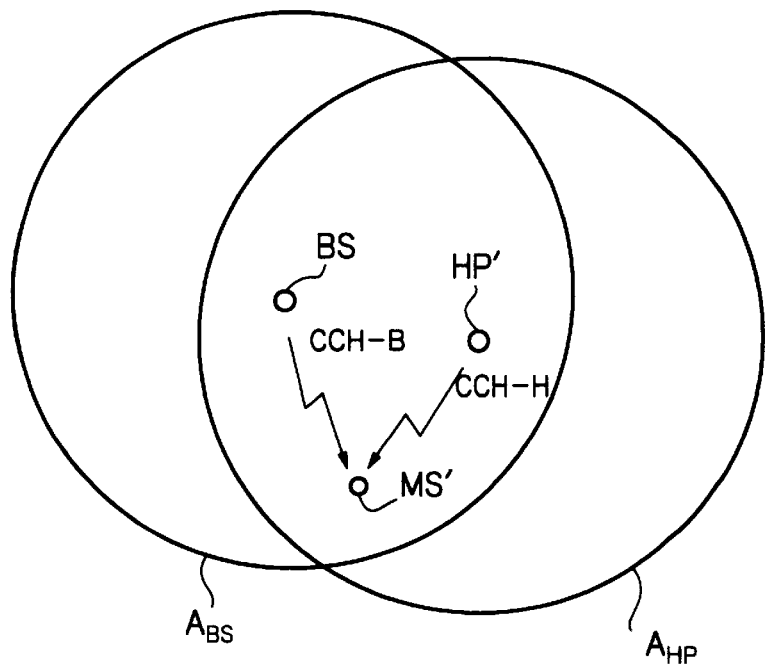
Figure 11B:
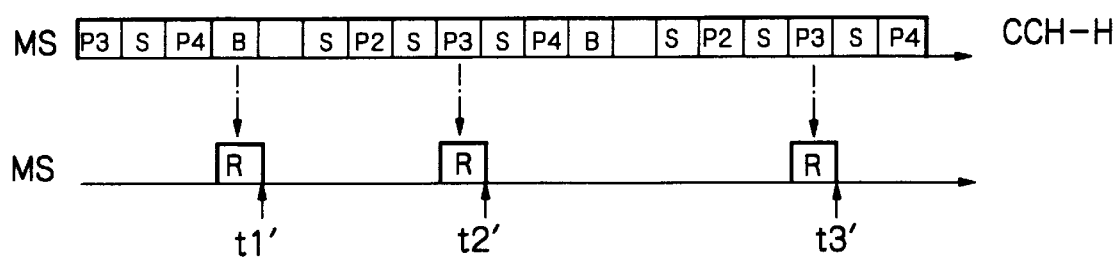

An incoming call receiving operation from only the host phone unit HP' is shown in FIGS. 11A and 11B. In this case, a switch SW2 (see FIG. 17) for a private incoming call receiving mode is turned on in advance. That is, the host phone uninit HP' generates a control channel CCH-H as shown in FIG. 11A which has TDMA time slots formed by a broadcasting channel B, paging calling channels P1, P2, . . . and a selective cell channel S, as shown in FIG. 11B.

As shown in FIG. 11B, at time t1', when the mobile station MS' receives a broadcasting channel B of the control channel CCH-B from the host phone unit HP, the mobile station MS' identifies a group to which it belongs according to the received broadcasting channel B. As a result, the mobile station MS' waits for an incoming call addressed to it by receiving paging calling channels such as P3 for the group. Therefore, at times t2', t3', . . . , the mobile station MS' receives special paging calling channels such as P3 of the control channel CCH-H intermittently, to complete an incoming call receiving operation for the host phone unit HP'.

Next, if reception of an incoming call from the host phone unit HP' is completed, a call connection requesting operation, a call connection operation and a speech operation for the host phone unit HP' are carried out in a similar way to those as shown in FIGS. 3A, 3B, 4A and 4B.

Figure 12A:
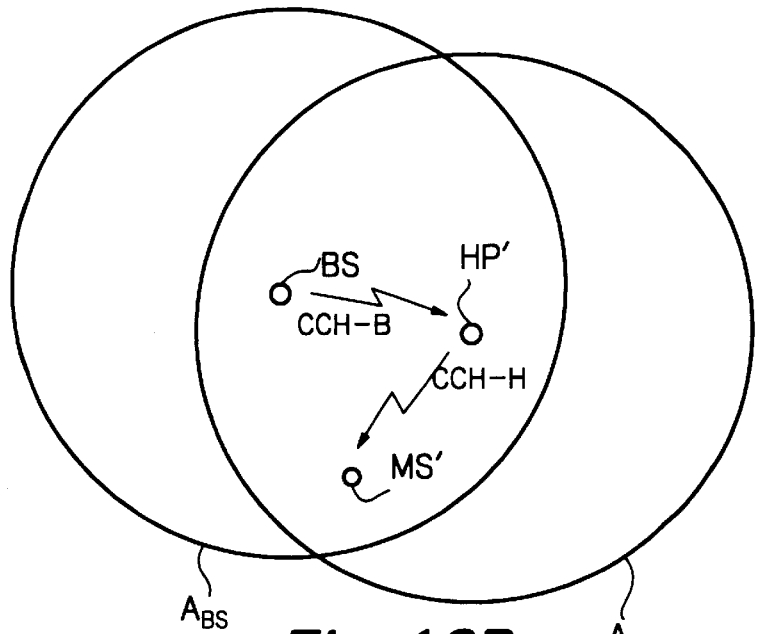
Figure 12B:
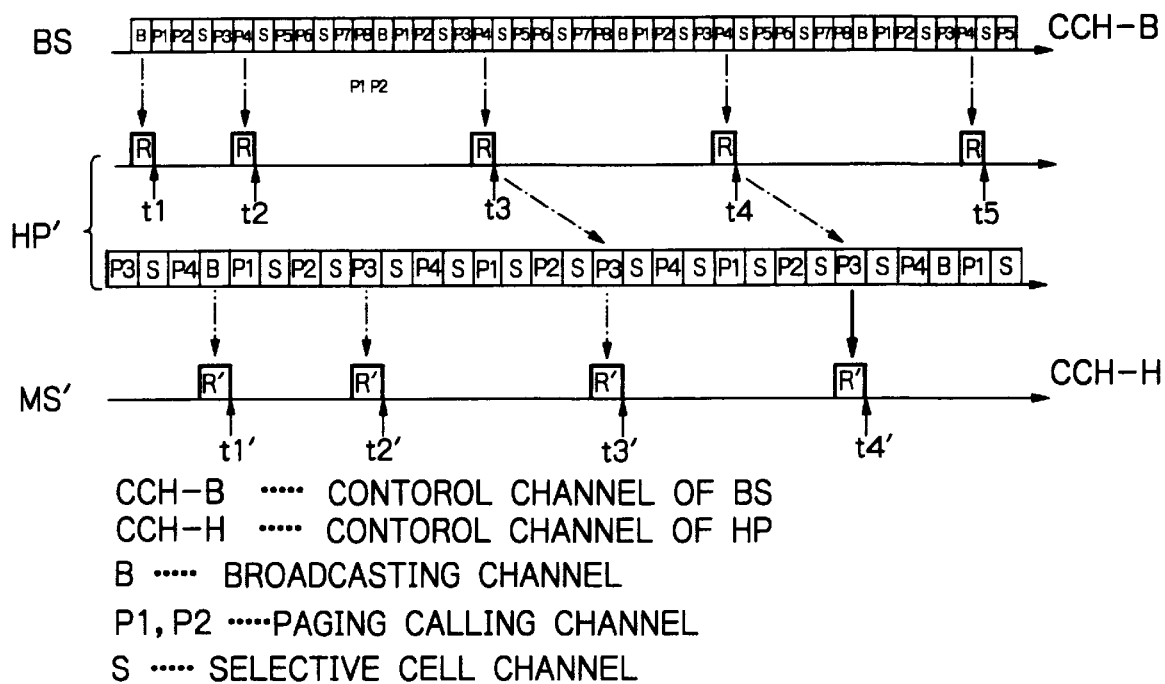

Simultaneous incoming call receiving operation from the base station BS and the host phone unit HP' is shown in FIGS. 12A and 12B. In this case, a switch SW3 (see FIG. 17) for a simultaneous incoming call receiving mode is turned ON in advance. That is, the base station BS generates a control channel CCH-B as shown in FIG. 12A which has TDMA time slots formed by a broadcasting channel B, paging calling channels P1, P2, . . . , and a selective cell channel S, as shown in FIG. 12B. In this case, the broadcasting channel B is transmitted to the host phone unit HP'.

If the host phone unit HP' receives a private call incoming, the host phone unit HP'0 generates a control channel CCH-H as shown in FIGS. 12A and 12B similar to the control channel CCH-B.

As shown in FIG. 12B, at time t1, when the host phone unit HP' receives a broadcasting channel B of the control channel CCH-B from the base station BS, the host phone unit HP' identifies a group to which it belongs according to the received broadcasting channel B. As a result, the host phone unit HP' waits for an incoming call addressed to it by receiving paging calling channels such as P4 for the group. Therefore, at times t2, t3, . . . , the host phone unit HP' receives special paging calling channels such as P4 of the control channel CCH-B intermittently.

On the other hand, as shown in FIG. 12B, at time t1', when the mobile station MS' receives a broadcasting channel B of the control channel CCH-H from the host phone unit HP', the mobile station MS' identifies a group to which it belongs according to the received broadcasting channel B. As a result, the mobile station MS' waits for an incoming call addressed to it by receiving paging calling channels such as P3 for the group. Therefore, at times t2', t3', . . . , the mobile station MS' receives special paging calling channels such as P3 of the control channel CCH-H intermittently. In this case, at times t3' and t4', the mobile station MS' recognizes that there is a public incoming call on the paging calling channel P3 of the control channel CCH-H from the host phone unit HP'.

Thereafter, when there is not any call on the paging calling channel P4 of the control channel CCH-B from the base station BS, the host phone unit HP' stops calling on the paging calling channel P3 of the control channel CCH-H.

Thus, the mobile station MS' can wait for an incoming call from both of the base station BS and the host phone unit HP' simultaneously.

Figure 13A:
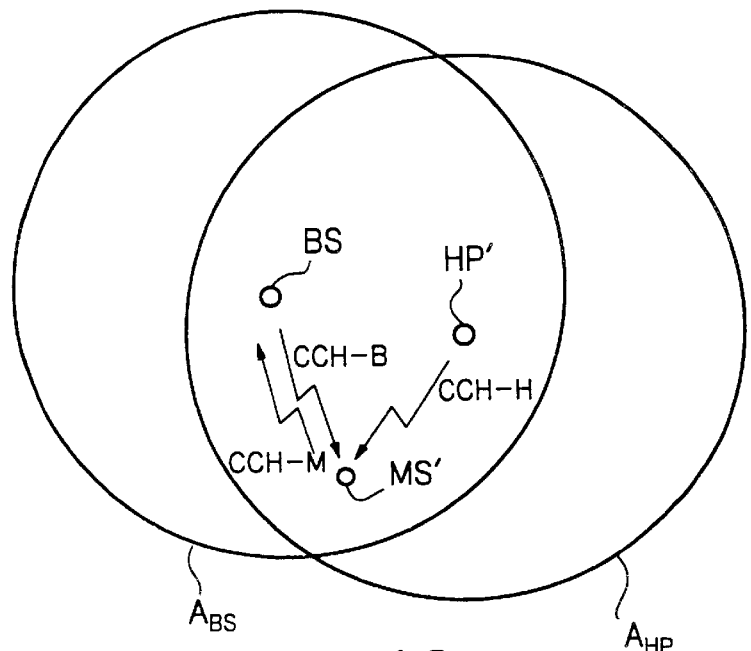
Figure 13B:
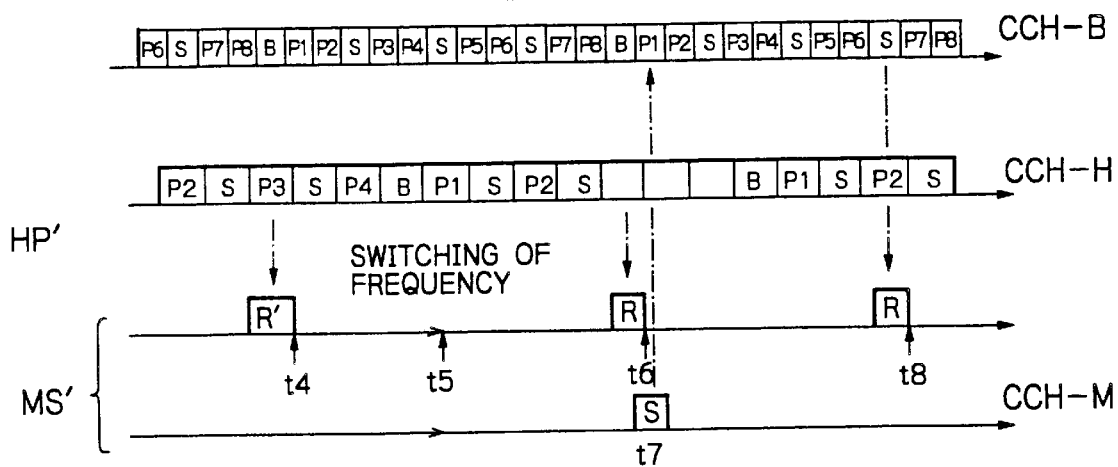

Next, if reception of an incoming call from the mobile station MS' is completed, a call connection requesting operation for the base station BS is carried out as shown in FIGS. 13A and 13B. That is, at time t5, the mobile station MS' switches the reception frequency from that of the control channel CCH-H to that of the control channel CCH-B. As a result, when the mobile station MS' receives a broadcasting channel B of the control channel CCH-B from the base station BS, the mobile station MS transmits a control channel CCH-M formed by a selective cell channel S to the base station BS, to request a call connection. Then, at time t8, the base station BS allocates a traffic channel to the mobile station MS' by using the selective cell channel S of the control channel CCH-B. As a result, the transmitting receiving frequencies are switched to a frequency of a bidirectional traffic channel TCH.

Figure 14A:
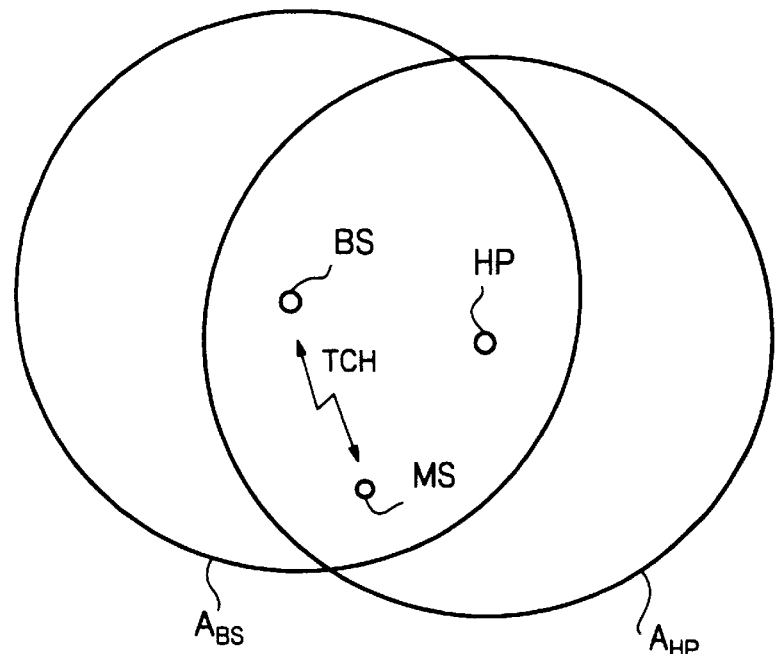
Figure 14B:
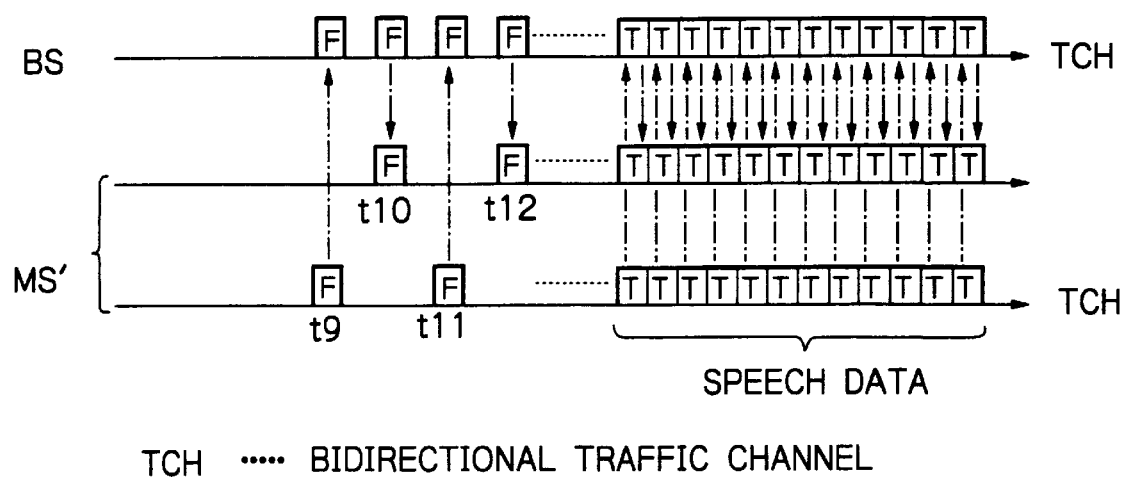

Finally, a call connection and speech operation for the base station BS are carried out as shown in FIGS. 14A and 14B. That is, at times t9, t10, t11 and t12, the mobile station MS' transmits a call connection message to the base station BS and receives a call connection message from the base station BS, to complete a call connection on the bidirectional traffic channel TCH. Thereafter, speech is realized by transmitting and receiving speech data continuously between the mobile station MS' and a calling party from the base station BS.

Note that, if reception of a private incoming call from the host phone unit HP' is completed, a connection requesting operation for the host phone unit HP', a call connection operation and a speech operation for the host phone unit HP' described above are carried out.

In FIG. 15, which is a detailed block diagram of the host phone unit HP' of FIG. 9 for realizing the operation as shown in FIGS. 10A, 10B, 11A, 11B, 12A, 12B, 13A, 13B, 14A and 14B, a radio section 52' is added to the host phone unit HP of FIG. 5. The radio section 52' receives a signal via the antenna 51 from base stations such as BS and demodulates the signal into data.

Figure 16:
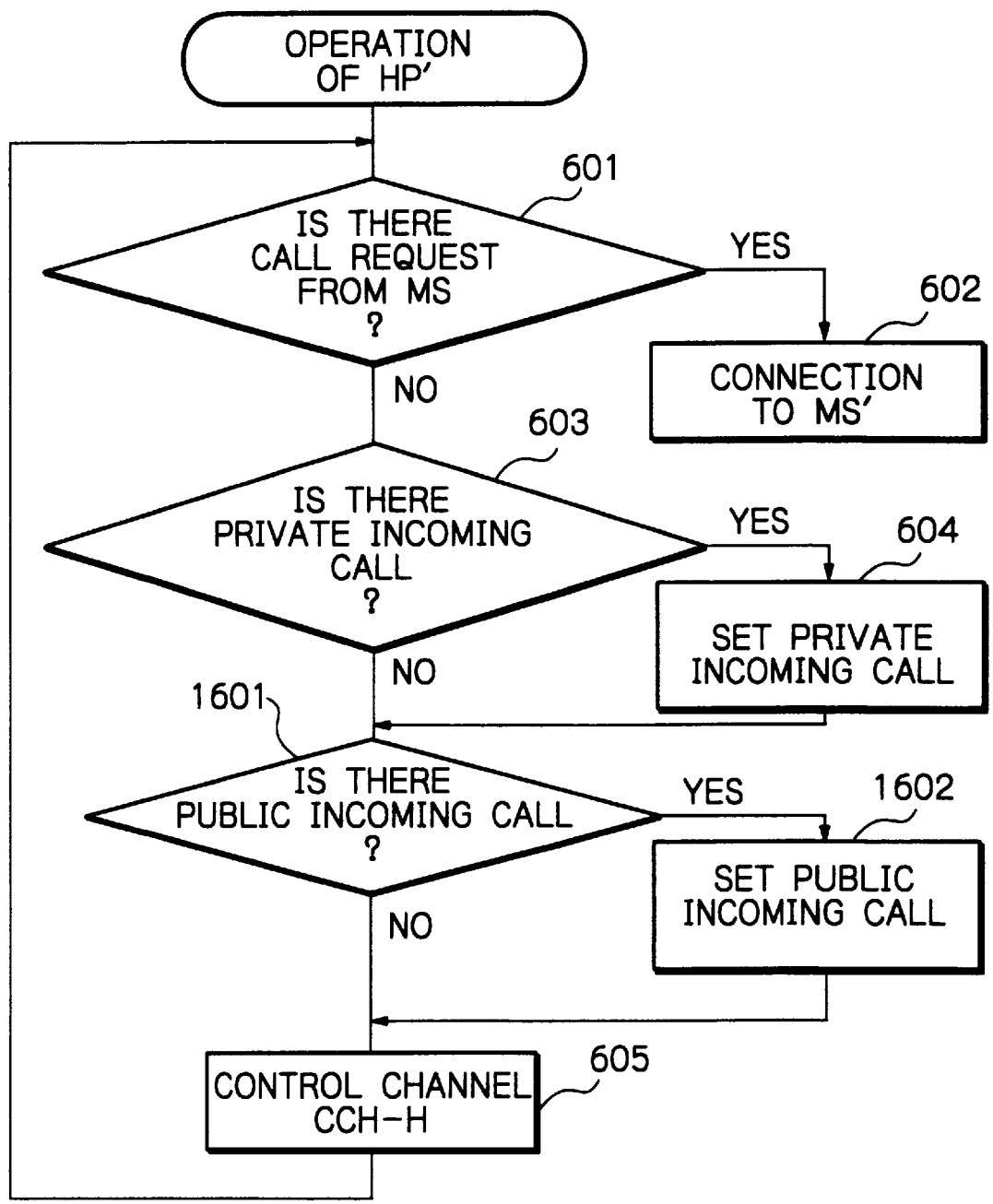
FIG. 16 is a flowchart showing the operation of the base station of FIG. 15.

An incoming call receiving operation of the host phone nit HP' of FIG. 9 is carried out by the control section 55 using a flowchart of FIG. 16, where steps 601 and 602 are added to the flowchart of FIG. 6.

Firstly, at step 601, it is determined whether or not there is a reception of a call request in a private control channel from the mobile station MS' by means of the channel codec section 53. If there is such a reception, the control proceeds to step 602 which connects a call to the mobile station MS'. Otherwise, the control proceeds to step 603.

At step 603, it is determined whether or not there is a private incoming call from the fixed network by means of the speech/line control section 54. If there is such a private incoming call, the control proceeds to step 604 which sets a private incoming call information in a control channel. Then, the control proceeds to step 601. If it is determined at step 603 that there is not a private incoming call, the control proceeds directly to step 601.

At step 601, it is determined whether or not there is a public incoming call from the base station BS by means of the channel codec section 53. If there is such a public incoming call, the control proceeds to step 602 which sets a public incoming call information in a control channel. Then, the control proceeds to step 605. If it is determined at step 601 that there is not a public incoming call, the control proceeds directly to step 605.

At step 605, the control selects a control channel transmission mode and transmits it to the channel/codec section 52, thus generating a control channel CCH-H as shown in FIG. 12A.

Figure 17:
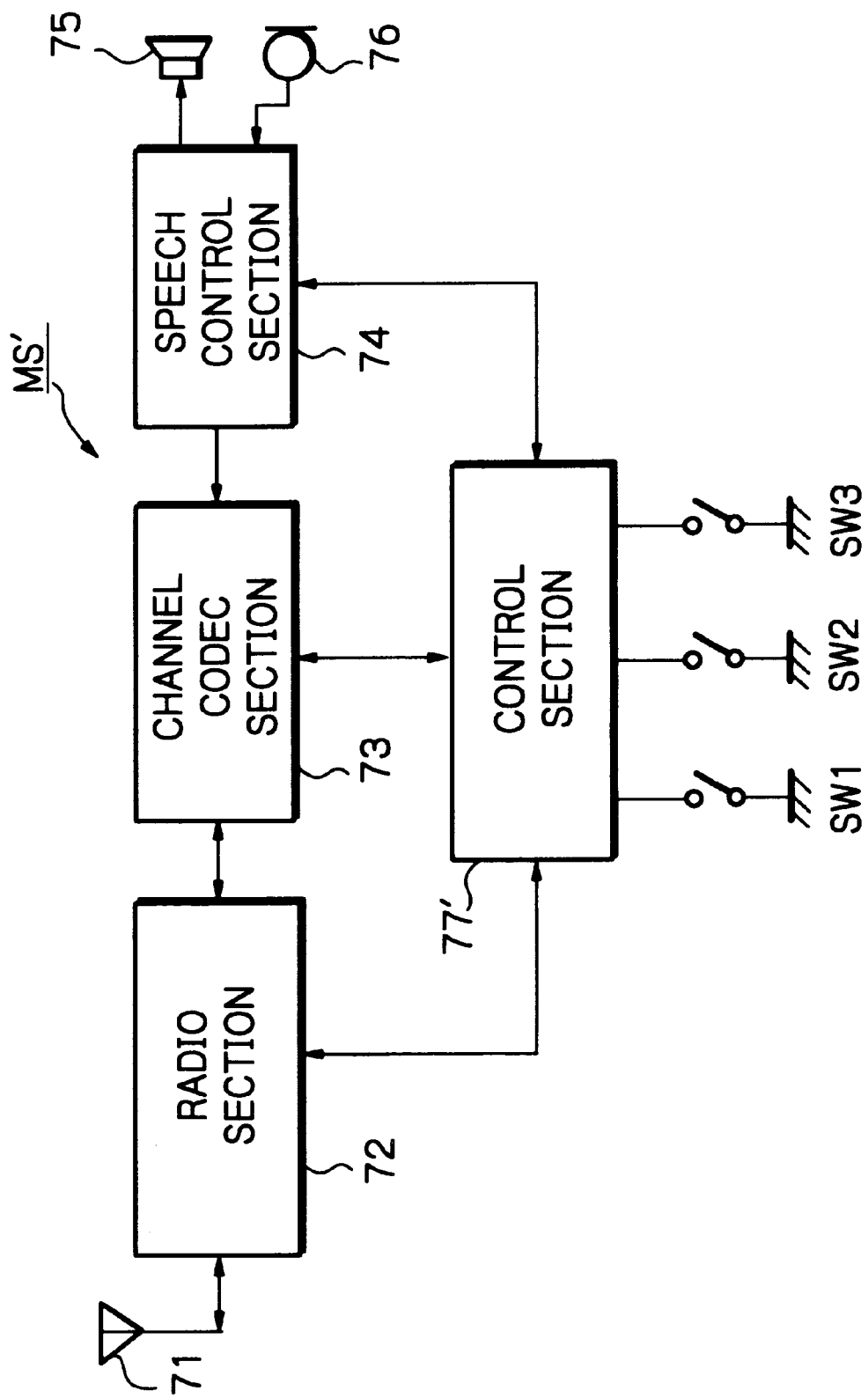
FIG. 17 is a detailed block diagram of the host phone unit of FIG. 9.

In FIG. 17, which is a detailed block diagram of the mobile station MS' of FIG. 9 for realizing the operation as shown in FIGS. 10A, 10B, 11A, 11B, 12A, 12B, 13A, 13B, 14A and 14B, a switch SW1 for a public incoming call receiving mode, a switch SW2 for a private incoming call receiving mode, and a switch SW3 for a simultaneous incoming call receiving mode are provided in the control section 77.

Figure 18:
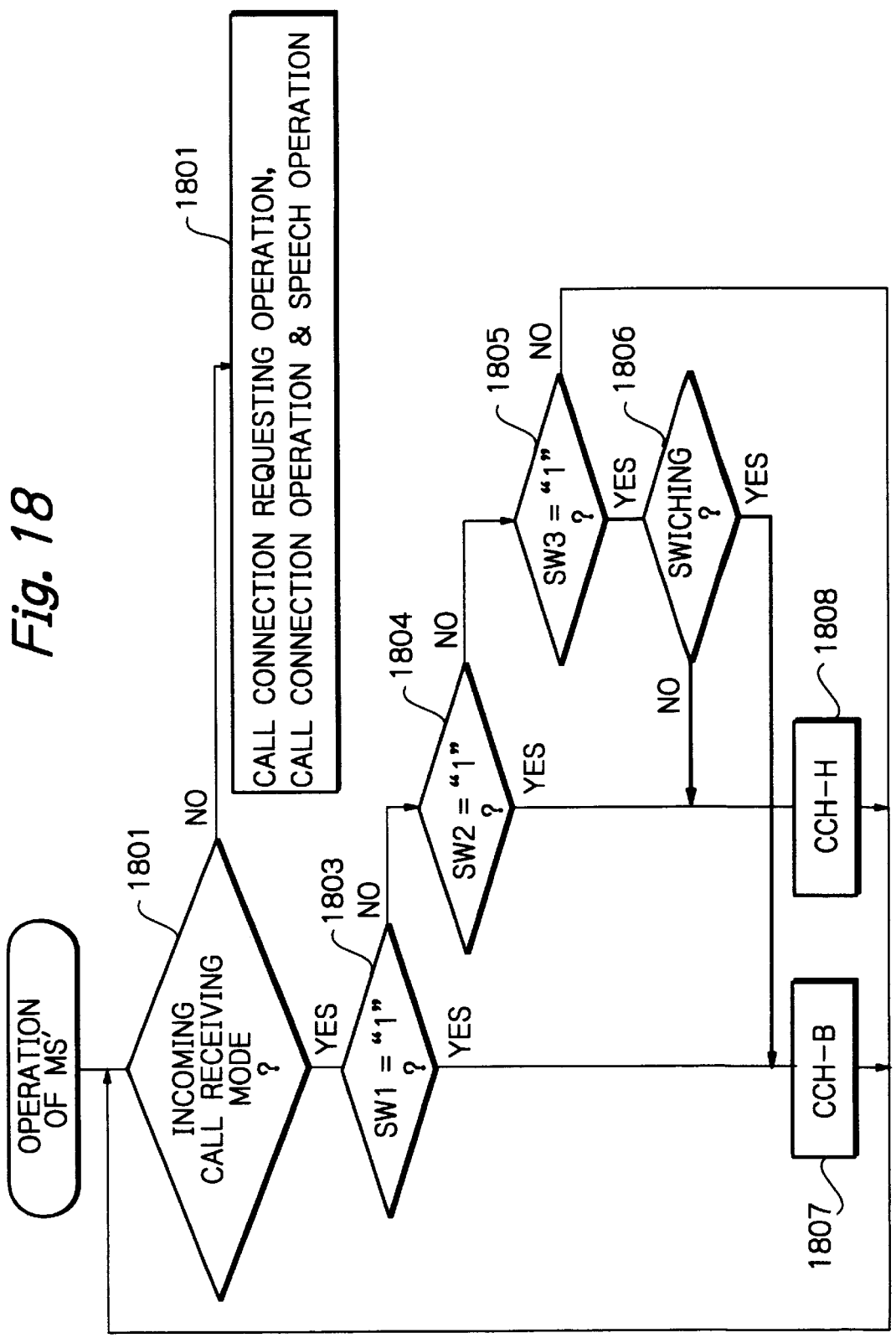
FIG. 18 is a flowchart showing the operation of the host phone unit of FIG. 17.

The operation of the mobile station MS' is carried out by the control section 77' using a flowchart of FIG. 18 in addition to the flowcharts of FIGS. 8A and 8B.

Firstly, at step 1801 of FIG. 18 it is determined whether or not the control is in an incoming call receiving mode. If the control is not in an incoming call receiving mode, the control proceeds to step 1802 which carries out other operations such as call connection requesting operation, a call connection operation and a speech operation as illustrated in FIGS. 13A, 13B, 14A and 14B. If the control is in an incoming call receiving mode, the control proceeds to steps 1803 through 1805.

At step 1803, it is determined whether or not the switch SW1 is turned ON; at step 1804, it is determined whether or not the switch SW2 is turned ON; and at step 1805, it is determined whether or hot the switch SW3 is turned ON.

If the switch SW1 is turned ON, the control proceeds from step 1803 to step 1807 which operates the radio section 72 to receive the frequency of the control channel CCH-B from the base station BS. Thus, in this case, if a broadcasting channel B of the control channel CCH-B, is received the operation as shown in FIG. 8A is started.

If the switch SW2 is turned ON, the control proceeds from step 1804 to step 1808 which operates the radio section 72 to receive the frequency of the control channel CCH-H from the host phone unit HP'. Thus, in this case, if a broadcasting channel B of the control channel CCH-H is received, the operation as shown in FIG. 8B is started.

If the switch SW3 is turned ON, the control proceeds from step 1805' to step 1806 which determines whether or not switching of reception frequency is carried out as shown in FIG. 13B (time t5). If the switch of reception frequency is not carried out yet, the control proceeds to step 1808 which operates the radio section 72 to receive the frequency of the control channel CCH-H. If the switch of reception frequency is already carried out, the proceeds to step 1807 which operate the radio section 72 to receive the frequency of the control channel CCH-B.

In the first embodiment, as means for confirming that the mobile station MS' and the host phone unit HP' are located within the service area $A_{BS}$ of the base station BS, the host phone unit HP' transmits to the mobile station MS' the identification code of the base station BS for which it is ready to wait. In order to do this, the host phone unit HP' detects the base station BS whose control channel it can receive, and stores the identification code of the base station BS. Then, the mobile station MS' makes sure that the identification code of the base station BS transmitted from the host phone unit HP' agrees with the identification code of a base station whose control channel it can receive. If they agree with each other, it recognizes that the mobile station MS' is ready to wait for an incoming call from both the base station BS and the host phone unit HP' simultaneously.

Figure 19:
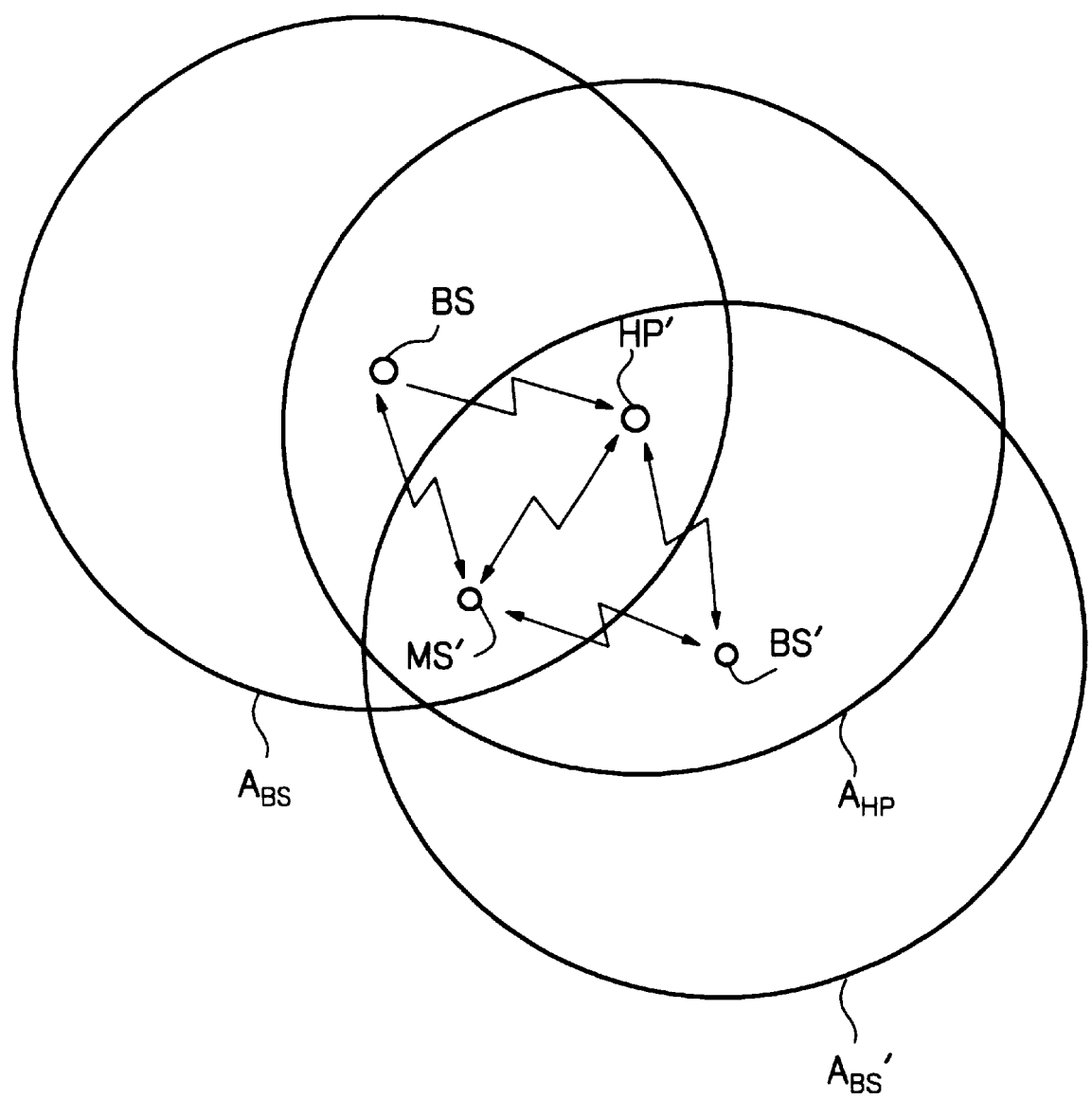
FIG. 19 is a diagram illustrating a second embodiment of the mobile communication system according to the present invention.

In FIG. 19, which illustrates a second embodiment of the mobile communication system according to the present invention, a base station BS' is added to the system of FIG. 9. In this case, the paging calling area of the base station BS is different from that of the paging calling area of the base station BS'.

Here, a paging calling area refers to a combined area of service areas of a plurality of base stations that provide a unit for calling mobile stations and registering their locations. Therefore, a mobile station registers its location each time it moves out from one paging calling area into another. Then, an upper station of the base stations for constituting one paging calling area specifies the paging calling area where a destination mobile station is located, and calls this destination mobile station. Thus, if there is a call in a paging calling area, all the base stations in that paging calling area transmit call information simultaneously, and no call takes place in other paging calling areas.

In FIG. 19, the mobile station MS' is located within a service area $A_{BS}'$ of the base station BS' as well as the service area $A_{BS}$ of the base station BS. Therefore, the mobile station MS' is located within the paging call area of a group of base stations including the base station BS' as well as within the paging call area of a group of base stations including the base station BS. As a result, when the host phone unit HP' receives a paging calling channel from one of the base stations BS and BS', it may not be able to find out which one of the paging calling areas of the base stations BS and BS' is registered by the mobile station MS'. Therefore, the host phone unit HP' cannot find out which one of the paging calling channels of the base stations BS and BS' is transmitting the call to the mobile station MS'

The above-mentioned problem is solved by the operation of the control section 77' as shown in FIG. 20. In FIG. 20, steps 2001 through 2006 are added to the flowchart of FIG. 16.

That is at step 601, when it is determined that there is a call request from the mobile station MS', i.e., there is a reception of the private control channel from the mobile station MS', the control proceeds to step 2001.

At step 2001, it is determined whether or not the received information from the mobile station MS' includes the number of the paging calling area currently registered by the mobile station MS' for the location thereof. If the received information does not provide the number of the currently registered paging calling area, the control proceeds to step 602 which carries out a connection to the mobile station MS'. On the other hand, if the received information provides the number of the currently registered paging calling area, the control proceeds to step 2002.

At step 2002, it is determined whether or not there are receivable levels of paging calling areas. When there are receivable levels of paging calling areas, the control proceeds to step 2003 which renews the registered base station. In this case, note that, if the currently registered paging calling area included in the received information at step 2001 coincides with one of the paging calling areas having receivable levels, the registered base station is not renewed. Then, at step 2004, the control section 77' sets the registered base station, thus waiting for an incoming call from the registered base station.

On the other hand, at step 2002, if it is determined that there are no receivable levels of paging calling areas, the control proceeds to step 2005 which stops the reception of any base station. Then, at step 2006, the control section 77' stops waiting for any base station.

In the second embodiment, even when the host phone unit HP' is located at the boundary of the paging calling areas and it is impossible to find out from which area a call is coming, the system can effectively operate. In other words, the system can effectively operate regardless of the location of the host phone unit HP' within any of the paging calling areas.

As explained hereinabove, according to the present invention, when a mobile station is located within an areas where the service area of a base station overlaps the service area of a host phone unit, since the host phone unit receives an incoming call from the base station and sends it to the mobile station, it is unnecessary for the mobile station to directly receive a control channel from the base station for a simultaneous incoming call receiving mode. As a result, the mobile station can reduce the power dissipation by more than 50 percent to achieve increased operating hours. In addition, since the mobile station is not required to switch to the frequency of the control channel of the base station in a simultaneous incoming call receiving mode, the mobile station can further reduce the power dissipation to increase the operating hours. In summary, the power dissipation can be reduced by more than 70 percent.

What is claimed is:

1. A waiting method in a mobile communication system including an outdoor public base station, an indoor private host phone unit, and a mobile station formed by a cordless handy phone unit, said waiting method carried out by said indoor private host phone unit comprising:

a first step of determining whether or not there is a reception through a private control channel from said mobile station and, when there is, branching to a call connecting operation;

a second step of determining whether or not there is a private incoming call when it is determined in said first step that there is no reception and selecting a private incoming call notification transmission mode when there is;

a third step of determining wherther or not there is a public incoming call from said outdoor public base station and selecting a public incoming call notification transmission mode only when there is; and a fourth step of selecting a control channel transmission mode and branching to said first step, said waiting method carried out by said mobile station comprising:

a fifth step of determining whether or not there is an incoming call from said indoor private host phone unit and, when there is not, determining again whether or not there is an incoming call;

a sixth step of determining, when it is determined in said fifth step that there is said incoming call, whether said incoming call is a notification of a public incoming call or a private incoming call;

a seventh step of connecting a call to said outdoor public base station when it is determined in said sixth step that said received incoming call is the notification of a public incoming call;

an eighth step of connecting a call to said indoor private host phone unit when it is determined in said sixth step that said received incoming call is the notification of a private incoming call; and a ninth step of branching to said fifth step, after said seventh and eighth steps are carried out.

2. A waiting method in a mobile communication system including an outdoor public base station, an indoor private host phone unit, and a mobile station formed by a cordless handy phone unit, said waiting method carried out by said indoor private hose phone unit comprising:

a first step of determining whether or not there is a reception through a private control channel from said mobile station;

a second step of determining, when it is determined in said first step that there is reception, whether or not it is the notification of a paging calling area number and where it is not, branching to a call connection operation;

a third step of determining whether or not said paging calling channel is receivable when it is determinied in said second step that the reception is the notification of a paging calling area number;

a fourth step of updating waiting for said outdoor public base station and selecting a start of waiting for said outdoor public base station notification transmission node when it is determined in said third step that said paging calling channel is receivable;

a fifth step of endign the waiting for said outdoor public station and selecting an end of waiting for said outdoor public base station notification transmission mode when it is determined in said fourth step that said paging calling channel is not receivable;

a sixth step of determining, when it is determined in said first step that there is not a reception, whether or not there is a private incoming call and selecting a private incoming call notification transmission mode only when there is;

a seventh step of determining whether or not there is a public incoming call and selecting a public incoming call notification transmission mode only when there is; and an eighth step of selecting a control channel transmission mode and branching to said first step after one of said fourth, fifth sixth steps is carried out.

* * * * *

UNITED STATES PATENT AND TRADEMARK OFFICE
CERTIFICATE OF CORRECTION

PATENT NO. : 6,138,035  
DATED : October 24, 2000  
INVENTOR(S) : S. Tsujita

Page 1 of 1

It is certified that error appears in the above-identified patent and that said Letters Patent is hereby corrected as shown below:

Column 6,
Line 55, "HP'0" should read -- HP' --

Column 7,
Line 61, "nit" should read -- unit --

Column 12, claim 2,
Line 11, "endign" should read -- ending --

Signed and Sealed this

Eleventh Day of December, 2001

Attest:

NICHOLAS P. GODICI
*Attesting Officer*     *Acting Director of the United States Patent and Trademark Office*